United States Patent [19]

Goodman

[11] 4,191,134
[45] Mar. 4, 1980

[54] FLUID INJECTION SYSTEM AND METHOD FOR AN INTERNAL COMBUSTION ENGINE

[75] Inventor: Toronta P. Goodman, Summit Point, W. Va.

[73] Assignee: The Goodman Systems, Inc., Armonk, N.Y.

[21] Appl. No.: 64,373

[22] Filed: Aug. 10, 1979

[51] Int. Cl.² .......................................... F02M 25/02
[52] U.S. Cl. .............................. 123/25 J; 123/25 R; 123/25 M; 261/18 A; 261/DIG. 66
[58] Field of Search ................. 123/25 R, 25 A, 25 J, 123/25 K, 25 L, 25 M, 25 N, 198 A, 119 D, 124 R; 60/304, 305, 307; 261/18 R, 18 A, 18 B, 30 C, DIG. 66

[56] References Cited

U.S. PATENT DOCUMENTS

| | | | |
|---|---|---|---|
| 1,317,362 | 9/1919 | Friestedt | 123/25 M |
| 1,525,621 | 2/1925 | Schaviak | |
| 2,493,808 | 1/1950 | Garrigus | |
| 2,507,596 | 5/1950 | Hodgkins | |
| 2,725,858 | 12/1955 | Tivoli | |
| 3,044,453 | 7/1962 | Hoffmann | |
| 3,283,482 | 11/1966 | Trafford et al. | 261/18 R |
| 3,364,909 | 1/1968 | Mick | 60/290 |
| 3,631,843 | 1/1972 | Yeiser | 123/25 M |
| 3,845,745 | 11/1974 | Dunlap et al. | 123/25 J |
| 3,930,470 | 1/1976 | Douglas | 123/25 A |
| 3,948,236 | 4/1976 | Natowski et al. | 60/307 |
| 3,987,774 | 10/1976 | Waag | |
| 4,007,718 | 2/1977 | Laprade et al. | 123/119 D |
| 4,016,837 | 4/1977 | Wentworth, Jr. | 123/25 R |
| 4,027,630 | 6/1977 | Giardini | 123/25 N |
| 4,037,406 | 7/1977 | Hartel | 123/119 D |
| 4,046,119 | 9/1977 | Perry | |
| 4,051,815 | 10/1977 | Coberley | |
| 4,078,527 | 3/1978 | Yasuda | |
| 4,119,062 | 10/1978 | Trevaskis et al. | |
| 4,125,092 | 11/1978 | Inamura | |
| 4,141,323 | 2/1979 | Hart | |

*Primary Examiner*—Ira S. Lazarus
*Attorney, Agent, or Firm*—Lane, Aitken & Ziems

[57] ABSTRACT

A fluid injection system and method for an internal combustion engine such as a spark-ignition or compression-ignition engine in which an injection nozzle injects a finely divided spray of fluid, such as water or a water solution, into the engine in response to a flow of atomizing air. The nozzle is connected to a fluid supply reservoir and to the outlet line of an air-injection pump that supplies pressurized air to the exhaust system of the engine. The air-injection pump provides the supply of atomizing air to the nozzle with the pressure of the air and therefore the fluid injection being responsive to both the engine speed and the exhaust gas pressure. The injected fluid advantageously functions as a cooling agent to suppress detonation and provide smoother engine operation and greater fuel efficiency.

25 Claims, 8 Drawing Figures

FIG. 6.
| PUMP | OFF | OFF/ON | ON | ON | OFF |
|---|---|---|---|---|---|
| ENGINE | START | WARM-UP | ACCEL. | CRUISE | DECEL. |
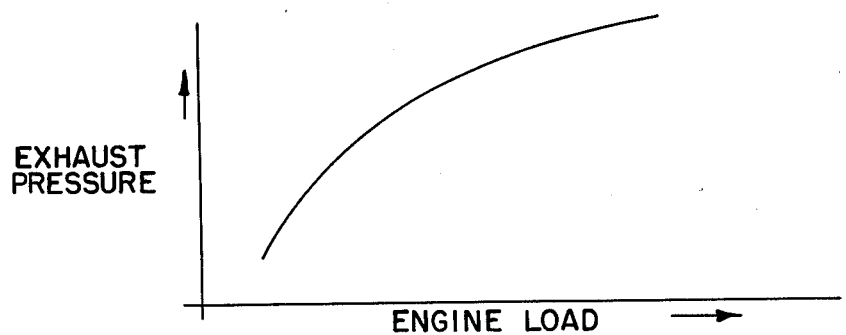
FIG. 7.
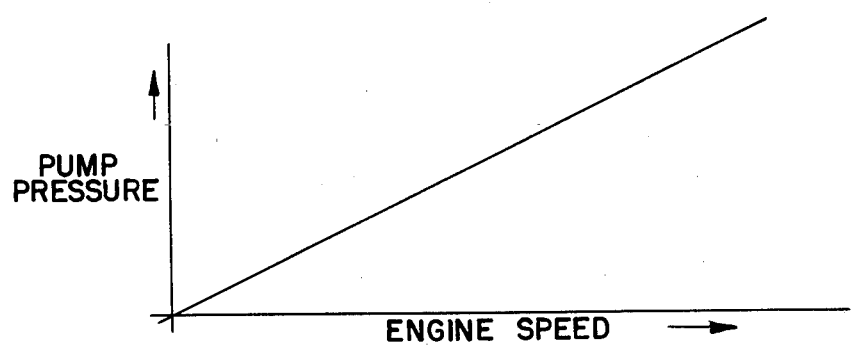
FIG. 8.

FLUID INJECTION SYSTEM AND METHOD FOR AN INTERNAL COMBUSTION ENGINE

BACKGROUND OF THE INVENTION

The present invention relates to a system and method for injecting a working fluid, such as injecting water or a water solution, into hydrocarbon combustion engines and, more specifically, to a fluid injection system and method for injecting fluid into spark-ignition and compression-ignition engines in which the injection rate is proportional to the engine speed and engine exhaust gas pressure.

Various cooling fluids, such as water and water in solution with other substances including hydrocarbon liquids such as methenol, have been commonly injected into hydrocarbon engines, both of the spark-ignition and compression-ignition type, to provide improved engine operation. The fluid absorbs heat within the combustion chamber and provides for an even burning rate to prevent or at least greatly mininize detonation of the fuel charge in the combustion chamber. In addition, the fluid tends to diminish the accumulation of carbon deposits within the combustion chamber and, because the combustion process takes place at a generally lower temperature, inhibits the formation of high-temperature pollutants, specifically the oxides of nitrogen ($NO_x$).

Various types of prior devices have been used to introduce cooling fluids into the intake air of internal combustion engines, either as a finely divided spray or by increasing the humidity of the intake air. These devices have included nozzle-type injectors and intake air humidifiers which are operated directly by the exhaust gases from the engine or either directly or indirectly in reponse to engine intake manifold pressure or engine speed. While these devices have generally provided some engine performance improvement, they have operated in a manner not totally responsive to engine requirements. Thus, in some prior systems, the fluid injection rate may be adequate under certain engine operating conditions, such as the constant-speed cruise condition, while the injection rate during other engine operating conditions, such as acceleration and deceleration may be too little or too much. When the fluid injection rate is insufficient, the beneficial effects of the cooling fluid are, of course, not obtained. Conversely, when the injection rate is too high the surplus of fluid within the combustion chamber tends to quench the combustion process and, of course, diminish engine performance.

SUMMARY OF THE INVENTION

It is therefor an object of the present invention, to provide a system and method for injecting a fluid, such as water or a water solution, into the air intake side of an internal combustion engine at a rate which is responsive to engine speed and exhaust gas pressure.

It is still another object of the present invention to provide a fluid injection system and method of the above type in which the injection is achieved by the flow of atomizing air through a jet nozzle in response to engine speed and engine exhaust gas pressure.

It is still another object of the present invention to provide a fluid injection system and method of the above type in which the injection occurs only at optimum times determined by the various operating modes of the engine.

It is another object of the present invention to provide a fluid injection system of the above type which is inexpensive to manufacture and which is simple and reliable in operation.

It is still a further object of the present invention to provide a fluid injection system of the above type which is simple to install on an internal combustion engine and which is ideally suited for after-market installations on previously manufactured vehicles.

In accordance with these objects and others, the present invention provides an injection system for injecting cooling fluid, such as water or a water solution, into the air intake of an internal combustion engine including both spark-ignition and compression-ignition engines. In the preferred form, a fluid injecting device, such as a jet nozzle, is located on the air intake side of an engine to introduce fluid in finely divided form into the intake air of the engine. The nozzle is connected to both a supply of cooling fluid and to a source of atomizing air that draws the fluid through the nozzle and into the air intake side of the engine. In a preferred embodiment, the atomizing air is supplied from the outlet line of a conventional engine driven, air-injection pump which is standard equipment on most late model vehicles and which is also connected to the exhaust gas side of the engine such that the flow rate of the atomizing air is responsive to both engine speed and to exhaust gas pressure.

BRIEF DESCRIPTION OF THE DRAWINGS

The above brief description, as well as further objects, features and advantages, of the present invention will be more fully appreciated by reference to the following detailed description of presently preferred but nonetheless illustrative embodiments in accordance with the present invention, when taken in conjunction with the accompanying drawings wherein:

FIG. 6 is a chart showing the selective operational modes of the air-injection pump and the internal combustion engine of FIG. 1;

FIG. 7 is an graphical illustration depicting the relationship between the engine load and the exhaust gas pressure of the engine; and FIG. 8 is an graphical illustration depicting the relationship between engine speed and pump pressure.

DESCRIPTION OF THE PREFERRED EMBODIMENT

Figure 1:
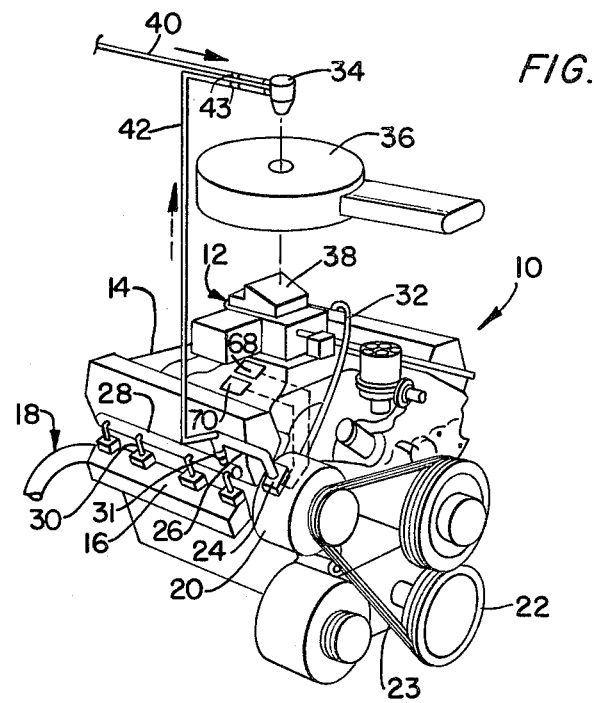
FIG. 1 is an exploded perspective view of an exemplary internal combustion engine equipped with the system of the present invention in which selected parts of the engine have been omitted for reasons of clarity.

An exemplary internal combustion engine incorporating the fluid injection system of the present invention is shown in FIG. 1 and is generally referred to by the reference character 10. The engine 10 is of conventional design and includes a carburetor 12 mounted on an intake manifold 14 for introducing a fuel/air charge into the combustion chambers of the engine. An exhaust manifold 16 is provided on each side of the engine for directing the exhaust gases produced during the combustion process through an exhaust system 18 (partially shown).

An air-injection pump 20, typically of the positive displacement type, is mounted on the engine by suitable brackets and fasteners (not shown) and is connected to the engine pump crankshaft pulley 22 by a belt 23. The output of the air-injection pump 20 is connected through a regulator 24 mounted on the pump housing and, via a hose 26, to an injection air distribution manifold 28 which, in turn, is connected by a plurality of short injection tubes 30 to the exhaust manifold 16 adjacent the outlet ports of the exhaust valves (not shown). A one-way valve 31 is provided in the hose 26 to prevent backflow of exhaust gases from the exhaust manifold when the pump 20 is inoperative. For the engine shown in FIG. 1, a second connecting hose 32 is provided from the outlet of the pump 20 to an injection air distribution manifold (not shown) on the opposite side of the engine 10 where it is connected to the other exhaust manifold in the manner described above.

A fluid injection, or jet nozzle 34 is provided to inject cooling fluid, such as water or a water solution, into the intake air side of the engine 10. In the preferred embodiment, the nozzle 34 is mounted in the engine air cleaner 36 above an inlet opening 38 of the carburetor 12 to direct a downwardly diverging flow of finely divided fluid droplets into the intake air. As can be appreciated, the position and location of the nozzle 34 can be varied as long as it is effective to introduce the fluid into the intake air.

Figure 2:
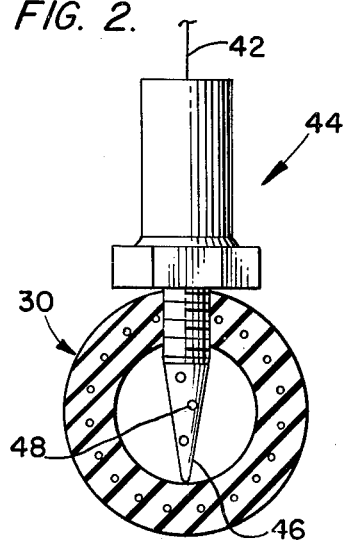
FIG. 2 is an elevational view, in partial cross-section of an arrangement for tapping into the air-injection pump outlet hose.

The nozzle 34 is connected to the source of fluid through a hose 40 and is also connected, via a hose 42 to the outlet of the air-injection pump 20 between the regulator 24 and the one-way valve 31. One-way valves 43 are also provided in hoses 40 and 42 to prevent any reverse flow of fluid and air, respectively from the nozzle. The connection of the hose 42 to the pump 20 can be effected by a direct connection to the outlet of the pump or by tapping into either one of the connecting hoses 30 or 32 by using a tap-like connection 44 of the type shown in FIG. 2. The tap-type connection 44 includes a pointed probe 46 adapted to penetrate the wall section of the hose 30 or 32, with the probe 46 including apertures or openings 48 to permit the passage of a portion of the outlet air from the air-injection pump 20 to the nozzle 34 via the hose 42. The air supplied from this connection to the outlet of the air-injection pump 20 serves to induce the flow of cooling fluid through the nozzle 34 in a manner described in more detail below.

Figure 3:
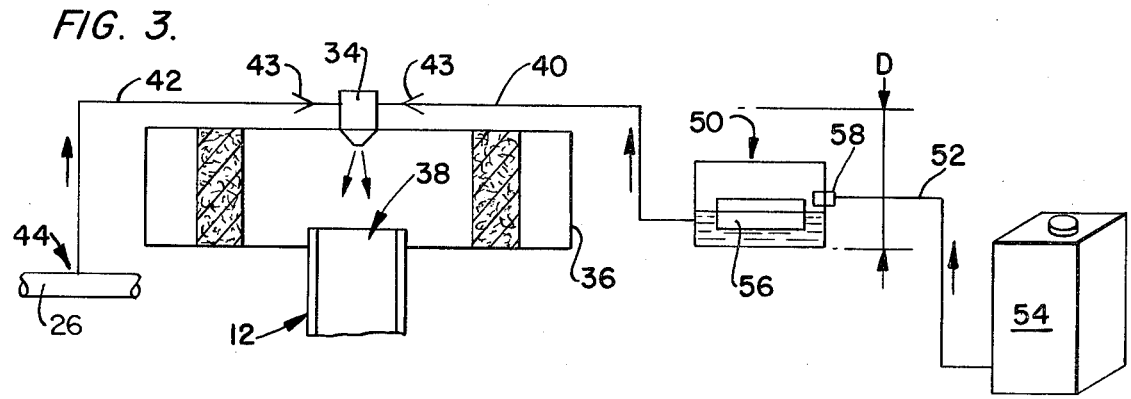
FIG. 3 is a schematic representation of the fluid injection system of the present invention.

As shown in the schematic view of FIG. 3, the supply hose 40 of the nozzle 34 is connected to a float-bowl reservoir 50 which, in turn, is connected through a supply line 52 to a container 54. The float-bowl reservoir 50 includes a float 56 that is connected to and operates an inlet valve 58, commonly of the needle valve type, to maintain a uniform level of cooling fluid within the reservoir 50. In the preferred embodiment, the container 54 is provided with a pump (not shown) for pumping the fluid to the reservoir 50. Also, the reservoir 50 is located at a selected elevation below the elevation of the nozzle 34, as indicated in FIG. 3 by the distance D, to prevent the fluid from unintentionally flowing under the influence of gravity to and through the nozzle 34. The reservoir 50, while not necessary to the operation of the system of the present invention, permits the supply container 54 to be located remotely from the engine compartment 10 at a convenient elevation relative to the nozzle 34.

Figures 4, 5:
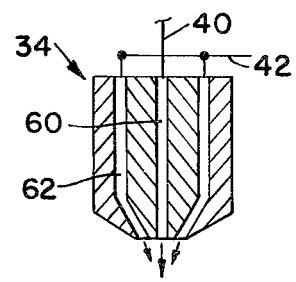
FIGS. 4 and 5 are cross-sectional views of two exemplary fluid injection nozzles suitable for use with the system of the present invention.

The nozzle 34 is adapted to provide a downwardly directed and preferably diverging flow of finely divided fluid droplets in response to the flow of air through the nozzle. While many different types of nozzles are suitable for use with the present invention, the nozzle 34 may include, as shown in FIG. 4, a central bore 60 for receiving the fluid from the hose 40 and a plurality of circumferentially arranged atomizing air supply channels 62 that receive air from the hose 42 and direct the flow of air to the outlet of the bore 60. The flow of air past the outlet of the bore 60 creates a low pressure zone which induces, or draws, fluid from the hose 40 and through the bore 60 in a conventional manner, where it is mixed with, and atomized by, the air before passing into the inlet 38 of the carburetor 12. In the alternative, a nozzle 34' of the type shown in FIG. 5 may be also provided which has a central bore 64 connected to the fluid supply hose 40 and an air-injection channel 66 connected to the air supply hose 42 that opens into the central bore 64 at an acute angle to effect the induction and atomizing function.

The operation of the air-injection pump 20 is controlled by a pair of control units 68 and 70, shown in FIG. 1, respectively mounted on the intake manifold 16 and the engine block directly below the intake manifold. The control unit 68 includes a valve (not shown) located in the intake manifold 16 for responding to intake manifold pressure and the control unit 70 includes a temperature responsive probe, or thermostat, for responding to engine temperature. The control units 68 and 70 are operatively connected to regulator 24 of the pump 20 as shown by the dashed lines, and function to activate the regulator whereby it causes the pump to direct pressurized air into the hoses 26, 32 and 42, and deactivate the regulator whereby it causes the pump to vent the air to atmosphere under conditions to be described later.

FIG. 6 indicates the relative operation of the engine 10 and the pump 20 under the control of the control units 68 and 70. As indicated, the pump 20 is OFF, or deactivated, by the control unit 70 during cold starts, and continues this in mode during warm-up until the engine temperature reaches a preselected value at which time the control unit 70 functions to place the pump in the ON, or activated, state. During normal acceleration and during cruise conditions, the pump 20 continues to operate in the activated state. However, during deceleration and during downhill coasting, the pump 20 is turned off, or deactivated, by the pressure valve of the control unit 68 which responds to the corresponding negative pressure occurring in the intake manifold.

FIGS. 7 and 8 graphically illustrate the relationship between the various operating parameters germane to the operation of the system of the present invention, which parameters are generally applicable to most late model vehicles operating in a "cruise mode." As shown in the graph of FIG. 7, the exhaust pressure increases in almost direct proportion to engine load. As a result, the output of the pump 20 which is responsive to the exhaust pressure, will vary accordingly in response to engine load.

The graph of FIG. 8 depicts the relationship between pump pressure and engine speed. Since the pump pressure is further modified by the exhaust pressure in response to engine load, i.e., the exhaust pressure of FIG.

7, which is load responsive, is additive to the pump pressure of FIG. 8, which is engine speed responsive; the changes in the air flow through the hose 42, and therefore the discharge from the nozzle 34, varies in response to the combined effects of engine speed and engine load. As a result, a precise metering of the fluid injection into the engine is achieved. Of course, during times that the air injection pump 20 is deactivated by the control units 68 and 70, (this is, during start, part of the warm-up sequence, and during deceleration), the pressure in the hoses 30 and 32, and consequently the flow rate of the atomizing air through the nozzle 34, decreases dramatically to minimize the introduction of fluid into the engine during these periods. Therefore, the fluid injection system of the present invention operates only at times which are optimum as determined by the various operating modes of the engine, resulting in a dramatic increase in engine efficiency.

It can be appreciated that the system of the present invention can be installed at a relatively low cost, especially since the air injection pump 20 and its associated components are provided as standard equipment on most late model vehicles for the purpose of more completely burning the hydrocarbons from the exhaust gases. However, while a preferred embodiment of the present invention utilizes the air from the outlet of the air injection pump, other pump arrangements may be likewise provided which do not utilize the standard-equipment provided with the automobile. For example, for those automobiles which are not equipped with air-injection pumps, a supercharger, or a pump similar to that discussed above, along with their associated components, can be utilized.

In a test involving the fluid injection system of the present invention, the system was installed on a 1978 Ford Model Fiesta automobile having a 4-cylinder front wheel drive engine. Prior to the installation of the fluid injection system of the present invention, the vehicle had a fuel economy of approximately 30 miles per gallon. Subsequent to the installation of the system on the same vehicle, the fuel economy was raised uniformly over a substantial period of time to approximately 34 miles per gallon. Typical operating parameters involved in obtaining this performance during the cruise mode of the vehicle include an engine RPM of 3000, resulting in an air pressure at the nozzle of 3 psig. This, in turn, would result in an injection of approximately 9 ounces of water per hour into the carburetor.

To demonstrate the influence that a varying exhaust gas pressure has on the water injection utilizing the above parameters, an increased load, such as, for example, a load resulting in a wide open throttle at the same (3000) RPM, would result in the air pressure at the nozzle increasing to 6 psig resulting in an injection of approximately 30 ounces of water per hour into the carburetor. Of course, these changes in air pressure and water injection are due solely to increases in the exhaust gas pressure as a result of the increased load.

It is understood that the above values are approximate only and will vary according to the type and condition of the vehicle and the conditions under which it is operated.

While the preferred embodiment of the fluid injection system of the present invention has been shown in combination with the engine illustrated in FIG. 1, as will be apparent to those skilled in the art, the fluid injection system can be applied to any one of a plurality of different types of engines including 4-cylinder, 6-cylinder and V-8 engines. Also, the present invention is not limited to use with engines having a carburetor for mixing air and fuel but can easily be adapted to compression-ignition, or fuel injection engines by directing the cooling fluid directly into the fuel inlet duct or cylinder of the engine.

Still other variations in the foregoing can be made within the scope of the invention. For example, although reference is made to the use of hoses to connect the various components in fluid flow communication, it is understood that other conduits such as tubing, pipes, etc. can be used. Also, a demand regulator, or the like, can be provided in place of the float-bowl reservoir 50 to provide the fluid to the hose 40. Further, it is understood that the pump 20 can be driven in any manner proportional to engine speed other than by direct connection to the output shaft, as shown.

As will be apparent from those skilled in the art, various changes and modifications may be made to the water injection system of the present invention without departing from the spirit and scope of the invention and recited in the appended claims and their legal equivalent.

What is claimed is:

1. A system for injecting fluid into a cylinder of an internal combustion engine having an output shaft and an exhaust system, said system comprising first means for receiving air and pressurizing said air, second means for introducing pressurized air from said first means to a source of said fluid for injecting said fluid into said cylinder, and third means in a responsive relation to said output shaft and said exhaust system for regulating the pressure of said latter pressurized air in response to engine speed and exhaust gas pressure before said pressurized air is introduced to said source of fluid.

2. The system of claim 1 wherein said second means comprises a nozzle connected to said source of fluid and means connecting said nozzle to said latter pressurized air, said nozzle including fluid and air flow passages formed and arranged in a manner to draw said fluid from said source and through said fluid flow passage in response to the flow of air through said air flow passage.

3. The system of claim 2 wherein said fluid and air flow passages are further formed and arranged to mix said fluid and air upon their discharging from said nozzle.

4. The system of claim 1 wherein said engine includes a carburetor which receives said fluid before it is injected into said cylinder.

5. The system of claim 1 wherein said third means comprises means operatively connecting said output shaft to said first means to drive said first means and thus pressurize said air in response to engine speed.

6. The system of claims 1 or 5 wherein said third means comprises a first conduit connecting said first means to said second means, and a second conduit in fluid communication with the exhaust gases in said exhaust system and with said pressurized air flowing from said first means through said first conduit to vary the pressure of said air in response to the exhaust gas pressure.

7. The system of claim 6 wherein said exhaust system includes an exhaust manifold and wherein said second conduit extends from said exhaust manifold to said first conduit.

8. The system of claim 1 further comprising means for deactivating said first means in response to the temperature of said engine being below a predetermined value.

9. The system of claims 1 or 8 wherein said engine has an intake manifold and further comprising means responsive to fluid pressure in said intake manifold for deactivating said first means in response to the pressure in said intake manifold attaining a predetermined value.

10. In an internal combustion engine having a cylinder, an output shaft, an exhaust system and a pump driven in proportion to the output shaft for pressurizing air for passage to said exhaust system, the improvement comprising means for introducing pressurized air from said pump to a source of fluid for injecting said fluid into said cylinder, and means in a responsive relation to said output shaft and said exhaust system for regulating the pressure of said latter pressurized air in response to engine speed and exhaust gas pressure before said pressurized air is introduced to said source of fluid.

11. The improvement of claim 10 wherein said introducing means comprises a nozzle connected to said source of fluid and means connecting said nozzle to said latter pressurized air, said nozzle including fluid and air flow passages formed and arranged in a manner to draw said fluid from said source and through said fluid flow passage in response to the flow of air through said air flow passage.

12. The improvement of claim 11 wherein said fluid and air flow passages are further formed and arranged to mix said fluid and air upon their discharging from said nozzle.

13. The improvement of claim 10 wherein said engine includes a carburetor which receives said fluid before it is injected into said cylinder.

14. The improvement of claim 10 wherein said regulating means comprises means operatively connecting said output shaft to said pump to drive said pump and thus pressurize said air in response to engine speed.

15. The improvement of claims 10 or 14 wherein said regulating means comprises a first conduit connecting said pump means to said introducing means, and a second conduit in fluid communication with the exhaust gases in said exhaust system and with said pressurized air flowing from said pump through said first conduit to vary the pressure of said air in response to the exhaust gas pressure.

16. The improvement of claim 15 wherein said exhaust system includes an exhaust manifold and wherein said second conduit extends from said exhaust manifold to said first conduit.

17. The improvement of claim 10 further comprising means for deactivating said pump in response to the temperature of said engine being below a predetermined value.

18. The improvement of claims 10 or 17 wherein said engine has an intake manifold and further comprising means responsive to fluid pressure in said intake manifold for deactivating said pump in response to the pressure in said intake manifold attaining a predetermined value.

19. A method for improving the efficiency of an internal combustion engine having a combustion chamber, an output shaft, an exhaust system and a air pressurizer driven by said output shaft for pressurizing air for passage to said exhaust system; said method comprising the steps of introducing pressurized air from said pressurizer to a source of fluid, injecting said fluid into said combustion chamber in response to said step of introducing, and regulating the pressure of said latter pressurized air in response to engine speed and exhaust gas pressure before said step of introducing.

20. The method of claim 19 wherein said step of injecting comprises the steps of passing said latter pressurized air through at least one air flow passage formed in a nozzle and drawing said fluid through a fluid flow passage in said nozzle in response to said step of passing.

21. The method of claim 19 further comprising the step of mixing said fluid and air upon their discharge from said nozzle.

22. The method of claim 19 further comprising the step of connecting said output shaft to said pressurizer to drive said pressurizer and thus pressurize said air in response to engine speed.

23. The method of claims 19 or 22 further comprising the step of placing the exhaust gases in said exhaust system in fluid communication with said pressurized air flowing from said pump to vary the pressure of said air in response to the exhaust gas pressure.

24. The method of claim 19 further comprising the step of deactivating said pump in response to the temperature of said engine being below a predetermined value.

25. The method of claims 19 or 24 further comprising the step of deactivating said pump in response to the pressure in the intake manifold of said engine attaining a predetermined value.

* * * * *

UNITED STATES PATENT AND TRADEMARK OFFICE
CERTIFICATE OF CORRECTION

PATENT NO. : 4,191,134
DATED : March 4, 1980
INVENTOR(S) : TORONTA P. GOODMAN

It is certified that error appears in the above-identified patent and that said Letters Patent are hereby corrected as shown below:

Column 1, line 8, after "hydrocarbon" insert --internal--.

IN THE CLAIMS:

Claims 23, 24 and 25, change "pump" (each occurrence) to --pressurizer--.

Signed and Sealed this

Seventeenth Day of June 1980

[SEAL]

Attest:

SIDNEY A. DIAMOND

Attesting Officer

Commissioner of Patents and Trademarks